(12) United States Patent
Naskali et al.

(10) Patent No.: US 7,344,353 B2
(45) Date of Patent: Mar. 18, 2008

(54) HELICAL WIND TURBINE

(75) Inventors: Pertti H. Naskali, Oakville (CA); Angus MacLean, Oakville (CA); Neil C. C. Gray, Oakville (CA); J. Harry Lewis, Dorchester (CA); A. Patrick Newall, Victoria (CA)

(73) Assignee: Arrowind Corporation, Oakville, Ontario (CA)

( * ) Notice: Subject to any disclaimer, the term of this patent is extended or adjusted under 35 U.S.C. 154(b) by 217 days.

(21) Appl. No.: 11/128,251

(22) Filed: May 13, 2005

(65) Prior Publication Data

US 2006/0257240 A1    Nov. 16, 2006

(51) Int. Cl.
*F03D 7/06*    (2006.01)
(52) U.S. Cl. .......................................... 415/4.2; 415/71
(58) Field of Classification Search ................. 415/4.2, 415/4.5, 31, 4.7, 907; 416/176, 196 A
See application file for complete search history.

(56) References Cited

U.S. PATENT DOCUMENTS

| | | | |
|---|---|---|---|
| 250,806 A | 12/1881 | Hamel | |
| 1,697,574 A | 1/1929 | Savonius | |
| 1,766,765 A | 6/1930 | Savonius | |
| 1,835,018 A | 12/1931 | Darrieus | |
| 4,012,163 A | 3/1977 | Baumgartner et al. | |
| 4,115,027 A | 9/1978 | Thomas | |
| 4,142,822 A | 3/1979 | Herbert et al. | |
| 4,180,367 A | 12/1979 | Drees | |
| 4,260,325 A | 4/1981 | Cymara | |
| 4,293,274 A * | 10/1981 | Gilman ........................ | 416/51 |
| 4,359,311 A | 11/1982 | Benesh | |
| 4,715,776 A | 12/1987 | Benesh | |
| 5,391,926 A | 2/1995 | Staley et al. | |
| 5,852,331 A | 12/1998 | Giorgini | |
| 6,481,957 B1 | 11/2002 | Brill | |
| 6,740,989 B2 | 5/2004 | Rowe | |
| 6,849,965 B2 | 2/2005 | Le Nabour et al. | |

* cited by examiner

*Primary Examiner*—Edward K. Look
*Assistant Examiner*—Dwayne J White
(74) *Attorney, Agent, or Firm*—Gowan Intellectual Property

(57) ABSTRACT

A vertical axis wind turbine wherein the blades of the rotor section of the wind turbine comprise at least sections wherein the blades have a non-linear configuration in the "z" axis. In a preferred embodiment, the blades of the rotor section have a linear trailing edge with a non-linear, and preferably helical, surface configuration. This particular design allows the blades to provide both a rotational force and a positive or negative lift component. Further, the blades define an open area in the center of the rotor section through which air flow can pass in order to create a vertical vortex of air. As such, a more efficient vertical axis wind turbine provided.

21 Claims, 8 Drawing Sheets

Fig. 1

HELICAL WIND TURBINE

FIELD OF THE INVENTION

The present invention relates to the field of wind turbines, and in particular, relates to vertical axis wind turbines having improved construction features.

BACKGROUND OF THE INVENTION

Wind is being increasingly used as a source of energy for driving windmills or wind turbines, in order to generate electrical power. For example, large scale horizontal axis windmills have recently been used extensively to drive electrical generators. However, these devices suffer from several disadvantages, including noise concerns, danger to birds and air traffic, obscuring the landscape with banks of rotating windmills due to their large scale design, and in the case of large diameter horizontal axis propellers, having the propellers reach or exceed supersonic speeds at the tips of the rotors. Also, they are impractical for smaller, owner-controlled applications.

Vertical axis wind turbines are also known and typically have a central vertical rotor section having a series of vanes that serve to rotate the wind turbine around a central axle located on the wind turbine's vertical axis when wind, from any direction, impacts on the wind turbine. Therefore, while a horizontal axis windmill must turn to face the wind direction, the orientation of a vertical axis wind turbine (or "wind turbine") remains unchanged regardless of wind direction. This reduces the design complexity of the wind turbine for use in smaller applications.

An early version of a vertical axis wind turbine was first disclosed by Savonius in U.S. Pat. No. 1,697,574, and later elaborated on in U.S. Pat. No. 1,766,765. These so-called "Savonius-type" vertical wind turbines provide a vertical axis wind turbine having at least two curved blades which overlap around an open central area in which area a central rotational axle was located. A substantially horizontal wind flow impacting on the Savonius-type vertical wind turbine causes an "S-shaped" flow of air through the centre of the wind turbine and thus causes the wind turbine to rotate. While the Savonius-type design provides the basis for a number of different wind turbine designs, it is common feature of these designs to have a vertical axle located in the center of the blades. However, this vertical axle creates unnecessary turbulence in the air flow through the wind turbine as the wind passes through the central opening between the blades.

Further, in some variations on this design, such as in U.S. Pat. No. 5,391,926 to Staley et al., or U.S. Pat. No. 5,852,331 to Giorgini, the blades of the wind turbine are, in fact, joined together at the centre axle so as to completely prevent wind from passing through the centre of the wind turbine.

Also, while Savonius states in U.S. Pat. No. 1,697,574 that various blade or vane designs such as cylindrical, helical, parabolical, conical, or spherical, might be used, the design provided in the patent is a merely a curved blade design which remains unchanged as one moves along the longitudinal axis of the wind turbine. No elaboration on the shapes or orientation of these alternative blade designs is provided. Further, while Giorgini also refers to a helical configuration, his design is better described as containing a curved rotor blade configuration.

As such, typical prior art Savonius-type, vertical wind turbines typically have a rotor blade design which is curved in the "x" and "y" axis, but is essentially linear in the "z" axis. That is, the blade position and shape are substantially unchanged as one moves along the vertical axis. Thus, a horizontal wind flow results in only a rotation force being applied to the wind turbine.

An additional issue in the design of any wind turbine is the need to reduce the rotation resistance, or in some cases, increase the rotation resistance, of the wind turbine rotor section. Typically, this rotation resistance is created by the weight of the turbine section of the wind turbine, as it rests on the base of the wind turbine. Commonly, in the Savonius-type design, this weight is supported, inter alia, by the centre axle which connects the turbine section to the base section, and thus, it would be beneficial to reduce the effective weight of the rotor section. However, in some applications, such as in conditions where high wind speeds are commonly encountered, such as on the tops of high buildings, it would be beneficial to increase the rotation resistance of the rotor section, as wind speeds increased. As such, it would be beneficial to provide a rotor section for a wind turbine which would either controllably reduce or increase its rotational resistance depending on its design parameters. Accordingly, providing a wind turbine in which the rotor section would provide either positive or negative lift would be of assistance in controlling the rotational resistance of the rotor section.

Also, it would be advantageous to provide a vertical axis wind turbine in which the turbulence in the centre of the rotor section of the wind turbine, caused by the centre axle, was effectively eliminated. It would also be advantageous to provide a wind turbine design in which the design of the wind turbine provided a reduction in the effective supported rotational weight of the turbine section of the wind turbine.

SUMMARY OF THE INVENTION

Accordingly, it is therefore an object of the present invention to provide a vertical axis wind turbine, which more efficiently enables capture of wind energy than prior art devices.

It is a further object of the invention to wind turbine design that provides a means to lower the effective weight, and thus the rotation resistance, of a vertical axis wind turbine rotor section section.

It is a still further object of the present invention to provide a vertical wind turbine design in which the turbulence created in the centre of the wind turbine rotor section, created by a centre axle, is reduced or eliminated.

It is further object of the invention to provide a wind turbine which is simply constructed of inexpensive material.

Further objects of the invention will be apparent from review of the disclosure, drawings and description of the invention below. However, the advantages set out hereinabove, as well as other objects and goals inherent thereto, are at least partially or fully provided by the wind turbine of the present invention, as set out herein below.

Accordingly, in one aspect, the present invention provides a vertical axis wind turbine having a base structure and a rotor section comprising at least two overlapping blades for collection of wind energy, a lower support brace attached to the lower end of each blade, an upper support brace attached to the upper end of each blade, an axle for rotation of said rotor section which axle is affixed to said lower support brace and is used to operatively connect said rotor section to said base structure, wherein at least a portion of said blades have a non-linear design, and preferably a helical design configuration, so as to provide both a rotation and a positive or negative lifting force on said rotor section as a result of wind impacting said wind turbine.

In a preferred embodiment, each blade of the rotor section has an inner surface, an outer surface, two ends, a leading edge at the exterior of said rotor section, and a trailing edge located nearer to the centre of said rotor section. Further, each trailing edge of each blade is preferably a linear vertical edge which provides a trailing edge which is substantially perpendicular to the upper and lower support braces, and wherein the remainder of the blade has a helical configuration. As such, in its most preferred embodiment, the blades of the vertical axis wind turbine of the present invention have a linear trailing edge and a helical surface configuration.

In a further preferred embodiment, the present invention also provides a vertical axis wind turbine having a central opening between each blade so as to provide a open area along the vertical rotation axis of the rotor section, and thereby eliminate the centre axle found in prior art vertical wind turbine designs.

In a still further preferred embodiment, the present invention also provides a vertical axis wind turbine having additional lift elements for reducing or increasing the effective weight of the rotor section. wherein the additional lift elements include at least one wind baffle on said base, or on one or more stators located near said wind turbine to direct wind energy into said rotor section. Additionally, a system utilizing magnetic repulsion or attraction might be used.

In a further aspect, the present invention also provides a rotor section, as defined herein above, for use in a wind turbine.

In a still further aspect, the present invention also provides a method of generating electrical energy by utilizing a vertical wind turbine of the type described herein with respect to the present invention.

BRIEF DESCRIPTION OF THE DRAWINGS

Embodiments of this invention will now be described by way of example only in association with the accompanying drawings in which.

DETAILED DESCRIPTION OF THE PREFERRED EMBODIMENTS

Figure 1:
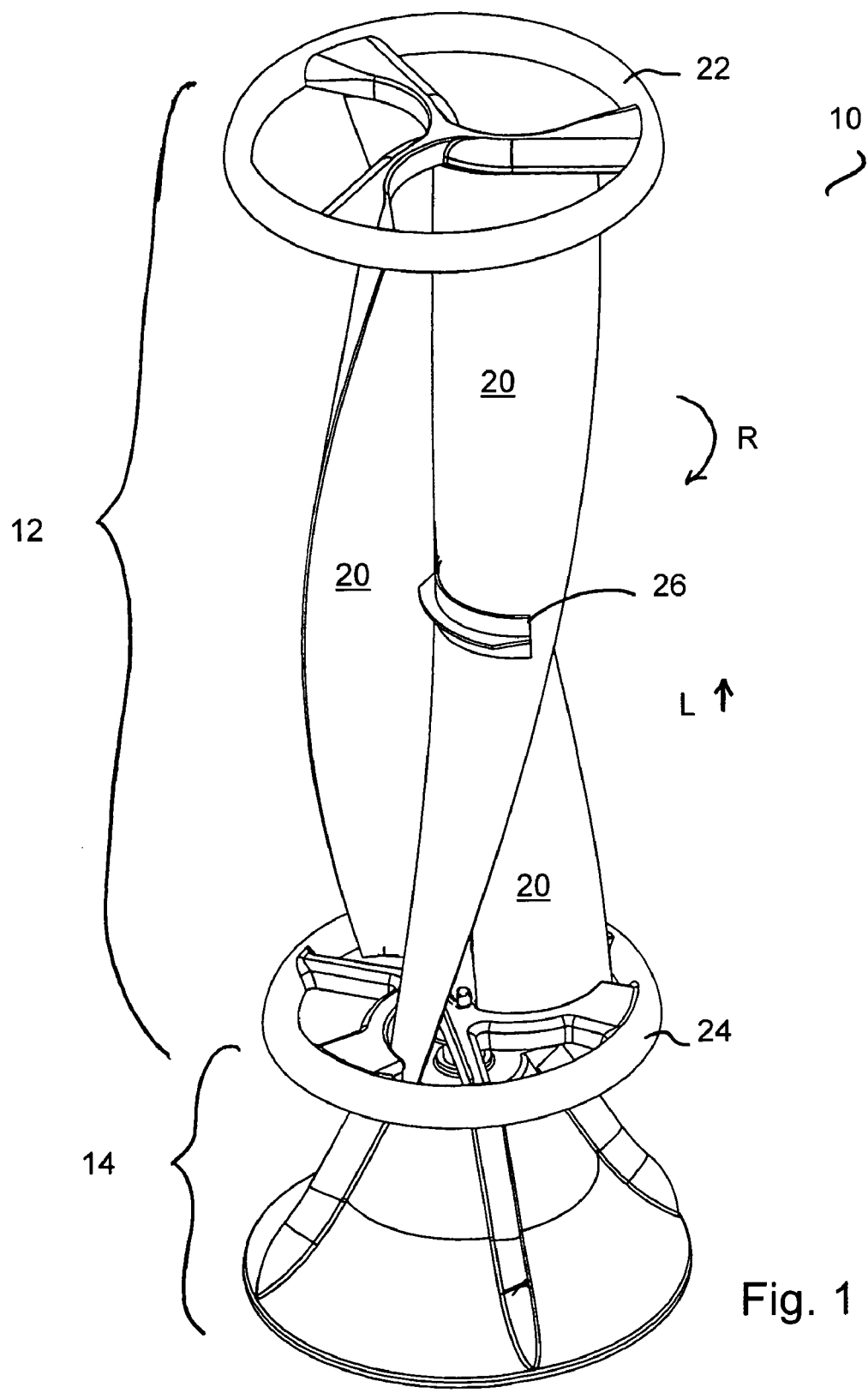
FIG. 1 is a perspective drawing of a preferred embodiment of a vertical axis wind turbine of the present invention.

The novel features which are believed to be characteristic of the present invention, as to its structure, organization, use and method of operation, together with further objectives and advantages thereof, will be better understood from the following drawings in which a presently preferred embodiment of the invention will now be illustrated by way of example only. In the drawings, like reference numerals depict like elements.

It is expressly understood, however, that the drawings are for the purpose of illustration and description only and are not intended as a definition of the limits of the invention.

Also, in the present application, a wind turbine is provided that is intended to be used in the generation of electrical energy as a result of the rotation of the wind turbine. While specific details of the wind turbine will be herein described, the use and conversion of the rotation energy to create electrical energy is believed to be within the scope of the prior art, and therefore will not be specifically described herein.

The present invention provides a vertical axis wind turbine with a turbine section that includes at least two, and preferably at least three or more rotor blades which are disposed for effecting rotation of the rotor section about a substantially vertical axis. Commonly, the number of blades in the rotor section will be between 2 and 10, but most preferably is between 3 and 5 blades. Preferably, each blade of the rotor section has at least a portion thereof which has a curved configuration in the "x" and "y" axis, and has at least a portion thereof which is non-linear configuration in the "z", or the longitudinal axis of the rotor. Preferably, the non-linear portion is in the form of a helix so as to provide a plurality of helical blades.

Each blade of the turbine section is also preferably configured so as to be circumferentially equally spaced apart about the rotor in an annular array. Further, each blade and/or the rotor section as a whole is rotationally balanced so the minimal vibration of the rotor section is encountered when the rotor section is spinning.

In a preferred embodiment, the helical blades overlap the central vertical axis so as to prevent wind from passing through the centre of the wind turbine rotor section without impacting the wind turbine blades, regardless of wind direction. The blades of the rotor section are held within an upper and lower support brace. The blades also are provided with sufficient structural integrity that the blades and the support braces prevent the turbine from any significant structural bending or flexing. As a result, the central axle, common to prior art Savonius-type vertical wind turbines, is preferably eliminated.

If required, or desired, optional intermediate support braces can be provided.

A key feature of the present invention is that of the orientation of the helical, or non-linear portion of blade design. In one preferred embodiment, the non-linear blades are orientated so as to provide a lifting force on the turbine section (so as to attempt to raise the rotor section off of the base section). As such, each non-linear blade portion is preferably orientated so that the wind will impact the blade on the radially inward and downward facing surface and thus, create both a rotation force and a lifting force. As a result, some of the wind energy is used to reduce the effective rotation weight of the rotor.

The amount and ratio of rotation force and lifting force can be adjusted by the design parameters of the helical blade design. Also, the rotor section rotation direction, and the lift direction can be adjusted by reversing the blade construction or orientation.

Referring to FIG. 1, a vertical axis wind turbine 10 according to the present invention is shown having a rotor section 12 operatively connected to a base section 14. Rotor section 12 comprises three identical blades 20 which are equally spaced circumferentially around rotor section 12, and each blade has a curved cross sectional configuration. Along the "z" axis, or the longitudinal vertical axis, each blade has a non-linear configuration. In this embodiment, each blade has a helical configuration, although other similar non-linear configurations might be used. Viewed from the top of rotor section 12, the rotor section 12 is designed to rotate in a clockwise direction as indicated by arrow "R" while base section 14 remains stationary, in response to an essentially horizontal wind flow, designated as "w" in FIG. 2, impacting the rotor section 12.

At the top of the rotor section 12, each blade is preferably fitted into an upper support brace 22 which is used to hold blades 20 in place. At the bottom of rotor section 12 is a lower support brace 24 which hold the bottom of blades 20, and additionally is used to attach rotor section 12 to an output axle 28. An intermediate support brace 26 is optionally located between upper and lower support braces 22 and 24. Additional support braces 26 can be used as required.

Figure 1B:
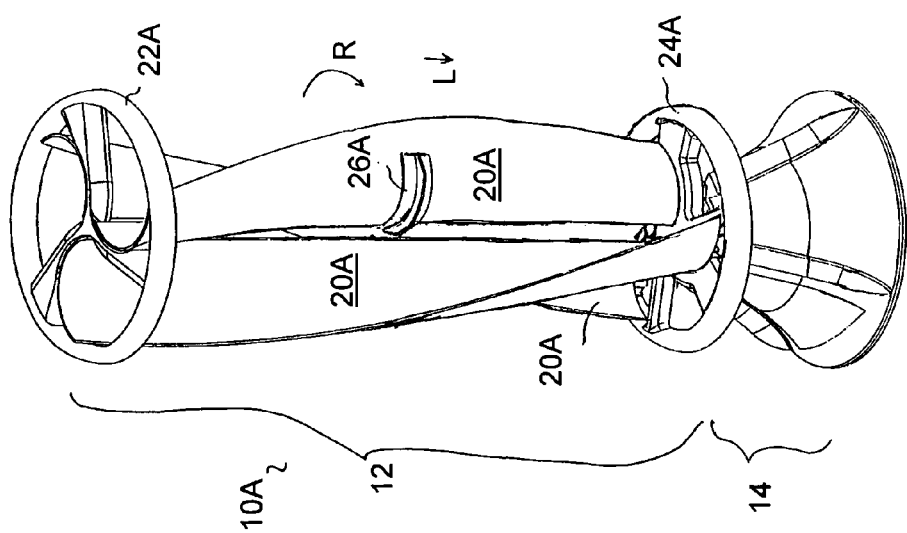
FIG. 1B is an alternative arrangement thereof.
Figure 3F:
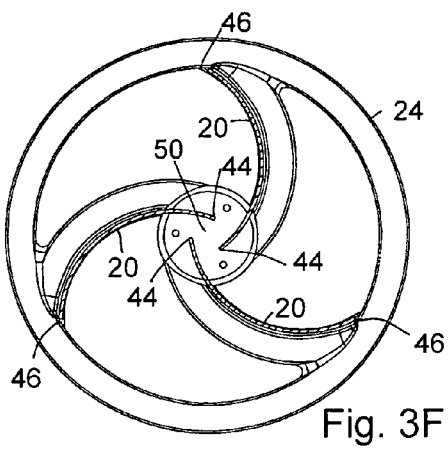
FIG. 3 (parts A to F) are a series of cross-sectional top views of the wind turbine of FIG. 2.
Figure 3C:
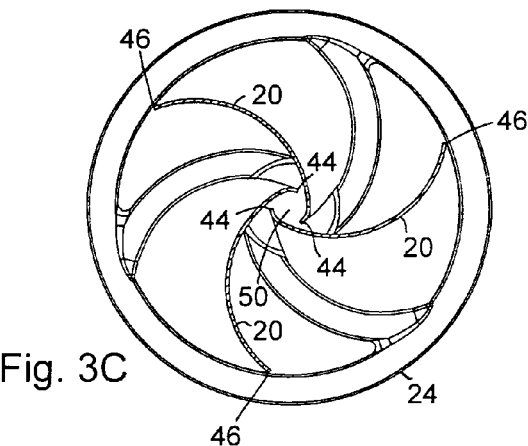
Figure 3E:
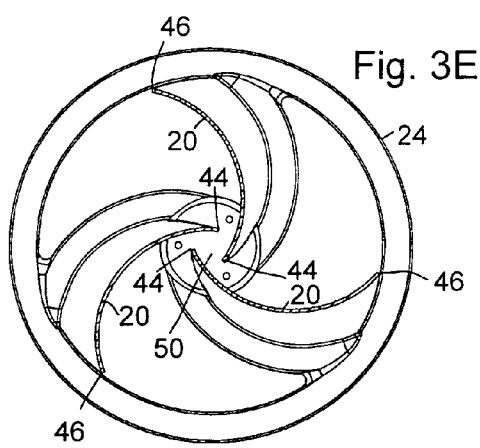
Figure 3B:
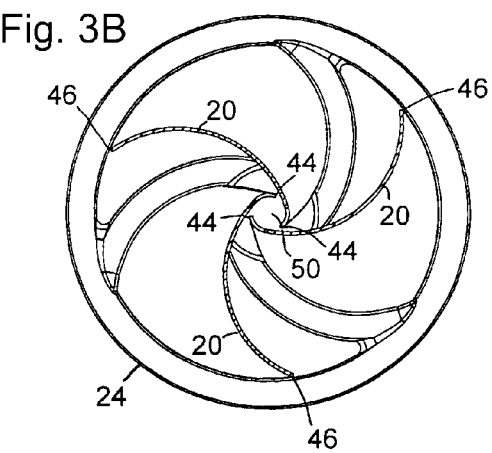
Figure 3D:
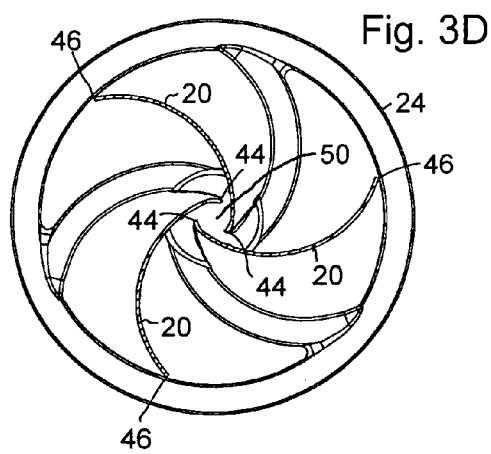
Figure 3A:
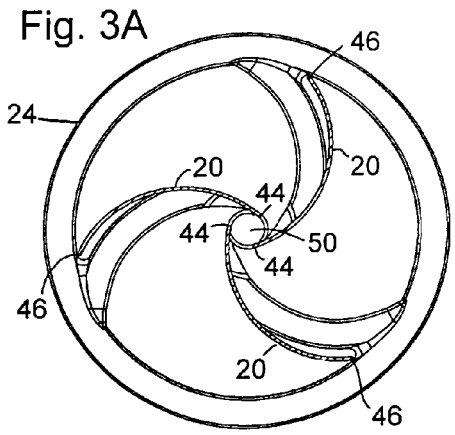

While a clockwise configuration of the rotor section is described, it is to be clearly understood by the skilled artisan, the orientation of the blades 20 may be reversed to drive rotor section 12 in a counter-clockwise direction if desired. Also, the orientation of the blades can be modified so as to provide negative lift, as shown in FIG. 1B. In this configuration, the rotor section still rotates in the direction of "R", but a downward force is applied to the rotor section. This can be useful in high wind situations where limiting the speed of the rotor section would be desirable, or in situations where the wind turbine was mounted upside down. This might occur, for example, in a situation where the wind turbine was mounted upside down on a bridge structure.

Commonly, electrical generation equipment, and the like (not shown) are contained in base section 14 and the energy from the rotation of the rotor section 12 is typically transferred to the electrical generation equipment through a rotating centre axle 28. As such, rotor section 12 is preferably operatively connected to the base section 14 by an axle 28 which merely extends from the lower support brace 24 to the electrical generation equipment located within the base structure. Various gears and/or power transmission elements might also be provided, in accordance with the known art, and the specific nature of the electrical generation equipment is also clearly known to those skilled in the art. As such, these features will not be described herein in any detail. In general, however, the rotating axle 28 from rotor section 12 is operatively connected to, or forms part of, an alternator or generator in base 14, of suitable size to produce electrical energy which is subsequently transmitted for on-site or off-site use. Alternatively, the energy generated by the system can be directly or indirectly stored by various means, such as in batteries, for use at a later time.

Figure 2:
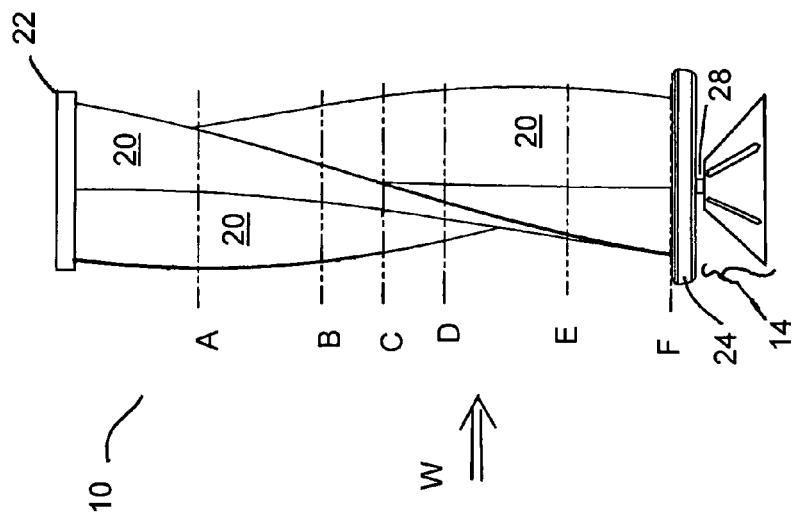
FIG. 2 is a plane view of the wind turbine of FIG. 1.

The axle 28, which is more clearly seen in FIG. 2, and/or the rotor section 12 weight is supported preferably by a roller bearing assembly, or the like, and or a sliding or support bearing assembly in which a flat surface on the rotor or axle slides on a corresponding surface on the base structure. Again, however, the design of this feature is known to those skilled in the art.

Impact of a substantially horizontal airflow against the inward and downward facing surfaces of blade 20 causes a rotational force that causes rotor section 12 to spin. It will be noted that a portion of the energy of the impacting airflow causes a positive or negative lifting force "L" on blade 20, and thus causes an overall positive or negative lifting force on rotor section 12. This has the effect of reducing or increasing the effective weight, respectively, of the rotor section 12 that rests on base 14. As a result, rotor section 12 is more easily, or less easily rotated.

In FIG. 3, a series of cross-sectional top views are shown, of the wind turbine of FIGS. 1 and 2. Figures "A" to "F" correspond to lines "A" to "F" marked on FIG. 3. Brace 26 has been removed. The overall non-linear, helical feature of blade 20 is clearly evident, as is the linear trailing edge 44 portion. As one moves from FIG. 3F to FIG. 3A, the open centre area 50 is clearly observed. Also, it is clear that this open centre area 50 is substantially surrounded by the three trailing edge 44 portions. Also, it is noted that while the leading edge 46 of each blade moves relative to the support ring structure 24, the trailing edge 44 position remains constant. Thus, the trailing edge 44 for each blade is substantially on a vertical line which is at right angles to the base.

Figure 4:
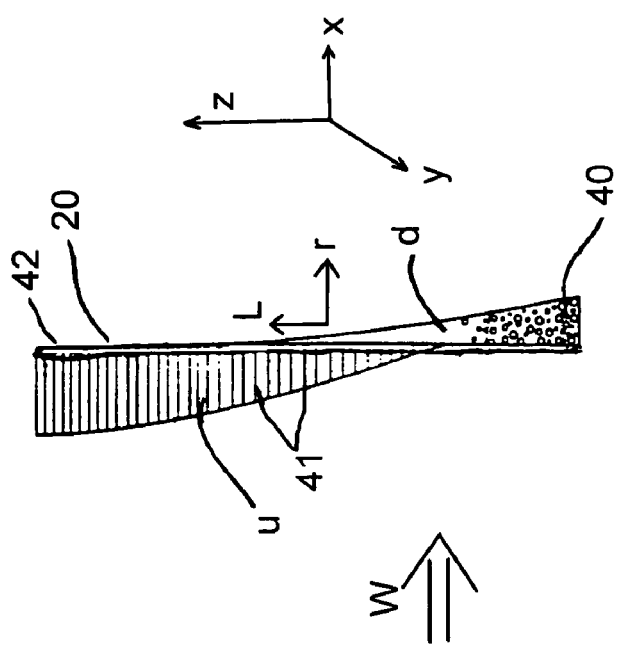
FIG. 4 is partial view of a portion of the wind turbine blade design.

In FIG. 4, a closer view of a portion of blade 20 is shown having an upper surface "u" and a lower, downward facing surface "d". The blade 20 is shown in relationship to a graphic representation of the "x", "y" and "z" axises. As can be seen, the impact of wind "w" on the surface "d" of blade 20 causes a rotation force component "r" and, in this embodiment, a positive lifting force component "L", as previously discussed.

Wind impacting on surface "d" is primarily used to cause rotor section 12 to rotate wherein most of the wind can "escape" from the curved blade surface. A portion of the wind, however, is diverted by the helical design down into the centre portion 50 of the rotor section. This creates a vortex of air which in this case of the device of FIG. 1, passes downwards through centre portion 50. However, this vortex of air can pass either upwards or downwards through centre portion 50 depending on the orientation of the blades. As such, this vortex of air provides either the positive or negative lift effect previously discussed.

In the embodiment shown in FIG. 4, the air flow would travel down through centre portion 50 and thus provide a positive lift force on rotor section 12. The air moving through this vortex would also provide a cooling effect on the electrical components contained with base section 14.

Surfaces "d" and "u" of each blade 20 may be treated so as to modify the drag coefficient of that surface of the blade. For example, this may take the form of a coating or a physical pattern on the surfaces, such as grooves or a stippled pattern on the surface. In this embodiment, however, surface "d" has a series of small ribs 41 that follow the curvature of the blade, and assist in capturing the airflow of the wind. Surface "u" has a dimpled pattern 40 that reduces the resistance of the movement of blade 20 as it is pushed through the air. The surface modifications can vary however, and can be applied to either surface depending on the design considerations of the particular wind turbine.

It can be noted that the dimpled pattern can include either or both concave or convex dimples, and dimples of various geometric shapes and sizes can be utilized. This includes circular, hexagonal, tear drop shaped dimples, or the like.

It will be clear that this adjustment of drag coefficient on the two blade surfaces can increase the effective amount of energy transferred from the wind to the blade element.

Further, it is noted that in FIG. 4, the leading edge 42 of blade 20 is shown. In this embodiment, blade 20 has an essentially constant cross-sectional thickness. While non-constant thicknesses might be used, providing a constant thickness facilitates production of the blades 20. Blades 20 can be produced from any suitable materials including metals, plastics, fabrics, ceramics or the like. It is desirable that the blades have sufficient structural integrity for their intended use, while have a low weight. Preferred materials include thermoplastic materials, and in particular, glass or carbon fibre reinforced polyethylene or polypropylene. This can include woven or non-woven materials. Also preferred are thermoset materials such as epoxy based, or polyetherimide based materials which are preferably used with glass or carbon fibre reinforced and/or woven materials.

Figure 5:
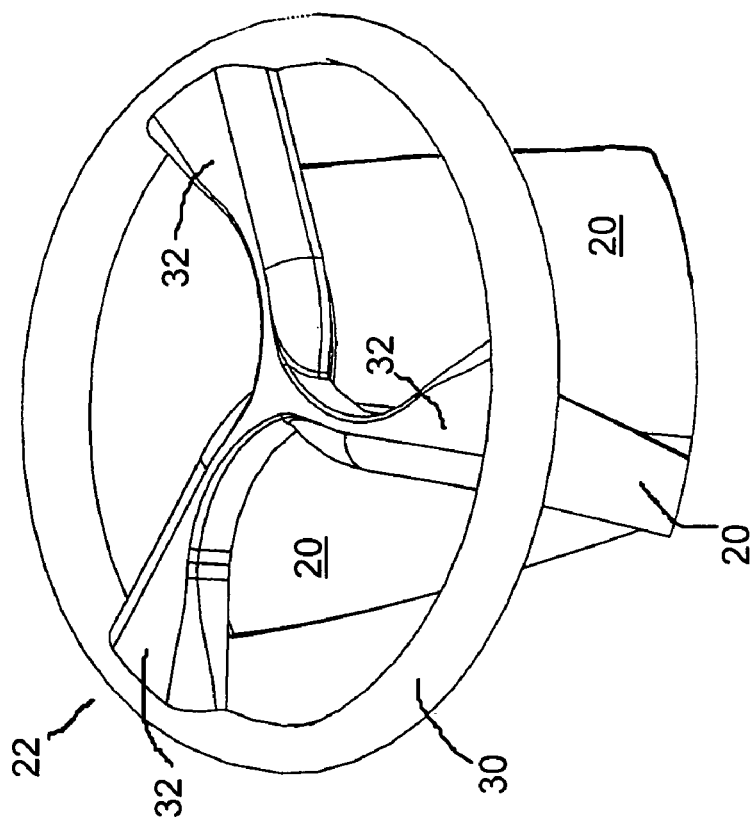
FIG. 5 is a perspective drawing of the top view of an upper support brace for the rotor section.

In FIG. 5, a top view of the upper portion of rotor section 12 is shown. In particular, details regarding upper support brace 22 are shown, in relationship to blades 20. Upper support brace 22 is shown having a structural ring 30 which provides structural stability to brace 22. Extending substantially radially inward from ring 30 are three supports 32 which meet in the centre of ring 30. Supports 32 are generally curved so as to correspond, in whole or in part, to the curved shape at the end of blade 20. The ends of blades 20 are shown in place and rest partially against supports 32, and partially against ring 30. They are held in place by friction fitting, and the force of the wind as the wind turbine 10 rotates, however, they can additionally be held in place by any of a number of suitable fastening means. This could include, for example, pins, rivets, screws, nails, glue, welds or the like.

Figure 7:
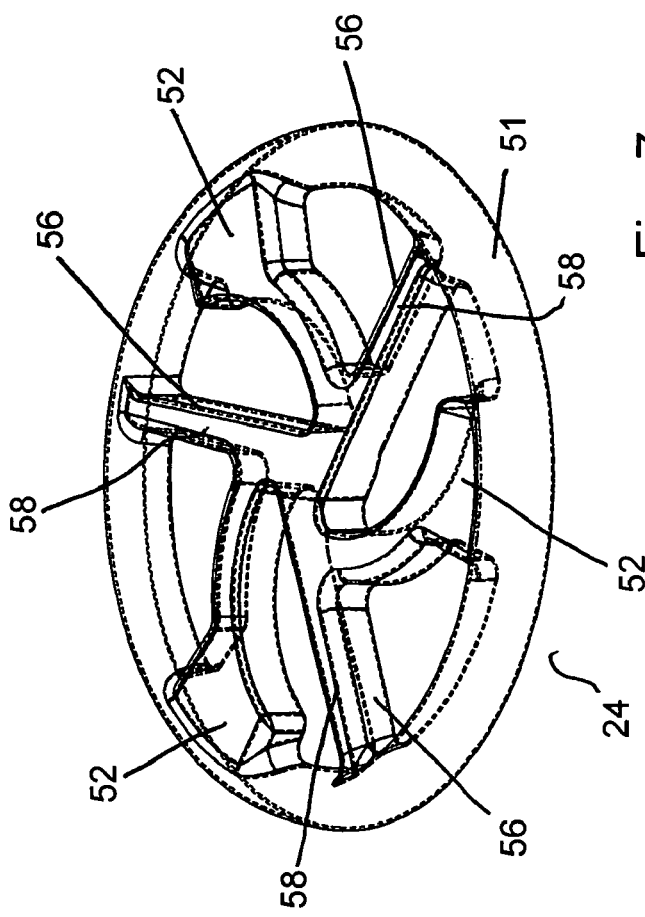
FIG. 7 is a perspective drawing of the bottom view of a lower support brace.
Figure 6:
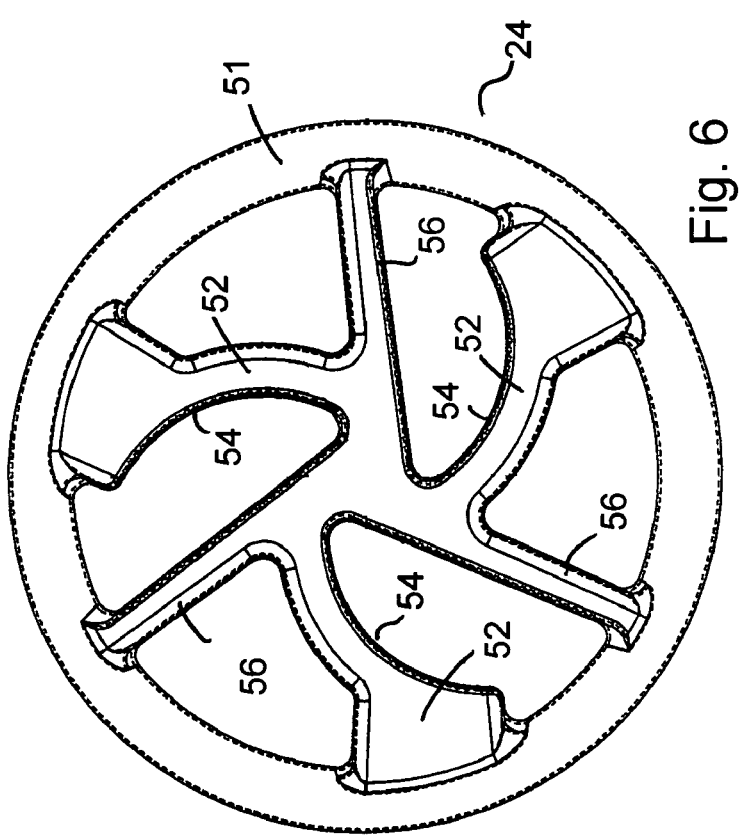
FIG. 6 is a perspective drawing of the upper view of a lower support brace for the rotor section.

In FIG. 6, a view of the top of lower support brace 24 is shown, and in FIG. 7, a view of the bottom of support brace 24 is shown. Again, lower support brace 24 has a structural ring 51 which provides structural stability to brace 24. Extending substantially radially inward from ring 51 are three supports 52 which meet in the centre of ring 51. Supports 52 have a curved surface 54 against which the curved ends of blades 20 can rest. The blades thus rest partially against supports 52, and partially against ring 51, and are held in place by friction fitting, and the force of the wind as the wind turbine 10 rotates. However, again, the blades can be held in place by any of a number of suitable fastening means. This could include, for example, pins, screws, nails, glue, welds or the like.

In an alternative design, (not shown) either or both of supports 22 or 52 can include channels which are adapted to receive all or any portion of the end section of blade 20. Again, while the blades may merely be friction fitted within these channels, they might also be held within the channels by any of the above stated fastening means.

Figure 9:
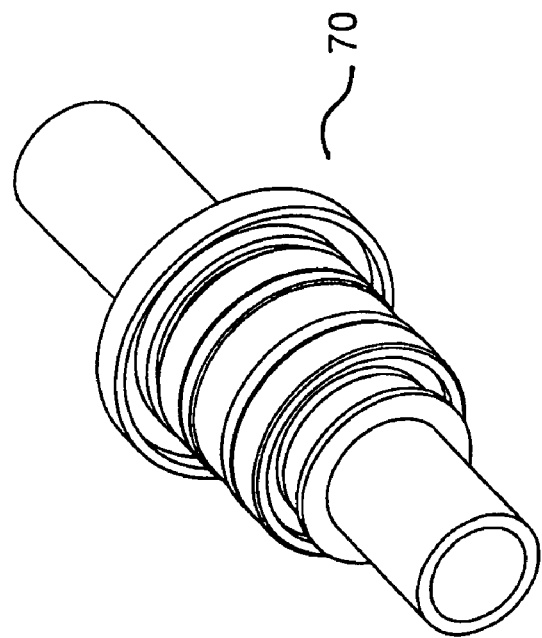
FIG. 9 is a perspective drawing of a wind turbine axle, of use in the present invention.
Figure 8:
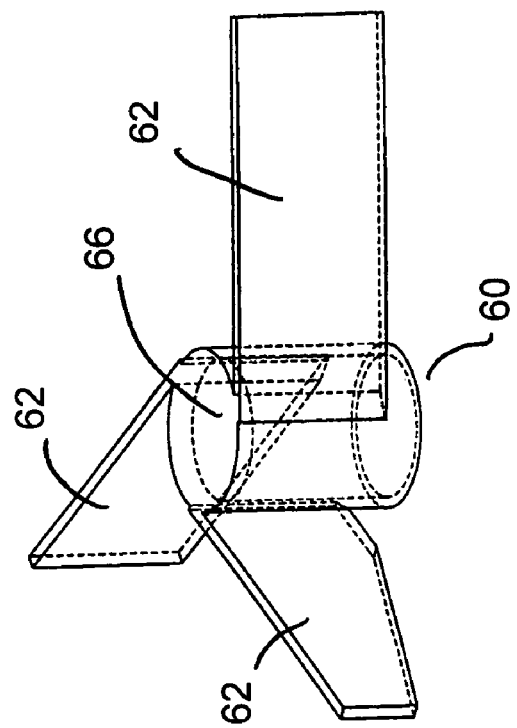
FIG. 8 is a perspective drawing of a bracket for fitting into lower support brace.

Also shown in FIGS. 6 and 7 are a set of three bracket support arms 56, which provide a channel 58, on the lower surface seen in FIG. 7, which bracket support arms are adapted to receive one of the arms 62 of bracket 60, shown in FIG. 8. At the center of bracket 60 is a cylindrical opening 66 which is adapted to receive the end of a circular axle 70, shown in FIG. 9.

In operation, blades 20 are mounted into upper and lower support braces 22 and 24. Arms 62 of bracket 60 are then inserted into channels 58 on lower support brace 24. One end of axle 70 is then inserted into opening 66 of bracket 60, and bracket 60 is bolted, or otherwise connected to axle 70 so that movement of bracket 60 will effect movement of axle 70. It can thus be seen that rotation of rotor section 12, caused by a horizontal airflow, will effect rotation of axle 70.

At this point, rotor section 12 is ready for mounting onto base section 14.

Figure 10:
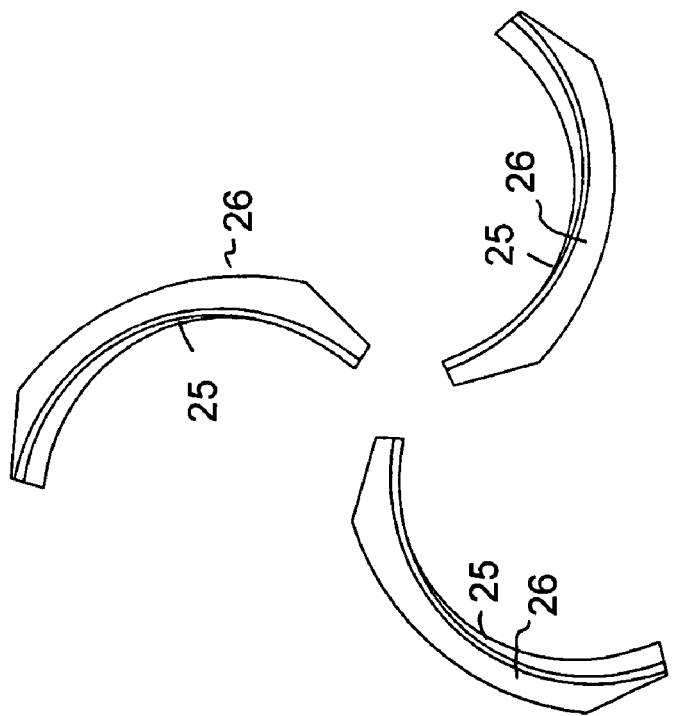
FIG. 10 is a top view of an optional intermediate support brace.

Additionally, a series of intermediate support braces 26 can be inserted onto blades 20 to provide additional structural support for the blades. Details of the construction of intermediate support braces 26 are shown in FIG. 10. In FIG. 10, three braces 26 are shown each of which has a concave curved surface 25 which is adapted to be fitted around one of the 3 blades 20 in the manner shown in FIG. 1. It is to be noted that braces 26 are not connected to one another, but are merely fitted around the blade. As such, an open area exists between braces 26 and thus, braces 26 do not interfere with the movement of air in the vortex established in the center of the blades 20, as previously described.

Additional intermediate braces 26 can be provided depending on the design parameters of the rotor section, and the number of intermediate braces for each blade can be increased or decreased depending on the blade length, width, depth, construction materials used, expected wind speeds, or the like. In general, additional braces 26 can be provided where it is felt that additional structural strength for blades 20 is required.

All braces used in the present invention can be constructed to include holes or openings in order to modify or assist in the air flow through the wind turbine, and particularly, the vortex air flow through the centre of the wind turbine.

All braces, including the upper support brace 22, the lower support brace 24, or intermediate support braces 26, can be manufactured from a variety of materials including plastics, ceramics, metal or the like. Any suitable material that provide sufficient structural integrity would be acceptable, however, materials with lower weight would be preferred. A particularly preferred material is aluminum, or a rigid thermoset or thermoplastic material.

Each blade 20 can be constructed as one-piece component. However, depending on the size of the rotor section, each blade 20 can be constructed of several components which are joined together to form a blade 20. In this situation, intermediate braces 26 can be used to reinforce the locations of where the blade components are joined and/or the blade components can be separately attached to braces 26 by pins, screws, nails, welds, grooves, glue, or the like, in order to connect the blade components together.

The rotor section can be built in any of a number of different sizes depending on the intended application. Preferably, however, the rotor section has an overall height of between 0.5 and 10 meters, more preferably between 1 and 5 meters and most preferably, between 1.5 and 3 meters. At this height, the wind turbines of the present invention are particularly well adapted for mounting on low rise buildings, including houses, apartments, business and manufacturing offices or the like. They are also well adapted to be located on, or under bridges or the like, and larger versions can be positioned in remote locations such as on mountain tops, open water platforms, or more generally, in locations where high and/or steady wind conditions would be encountered.

The diameter of the rotor section can also vary depending on design considerations. Preferably, however, the rotor section is circular in order to provide a structure which is rotationally balanced. The rotor section preferably has a diameter of between 0.25 and 5 meters, more preferably between 0.3 and 3 meters, and most preferably between 0.5 and 2 meters.

The opening 50 at the center of blades 20 can also vary depending on the design parameters. If the opening is too small, however, excessive wind noise can be encountered. If the opening is too large, the efficiency of the wind turbine is adversely affect because of the decrease in blade size. As such, preferably the opening 50 is between 2 and 50% of diameter of rotor section, more preferably between 5 and 30% and most preferably between 7 and 20%.

The size and other design features of the rotor section will vary depending on the expected application. However, in general, for expected wind speeds ranging between 2.5 m/sec and 30 m/sec, a rotor of 1.5 meters height and having a diameter of 0.5 meters, with three helical blades and a centre opening of 4 cm would be suggested.

Figure 11:
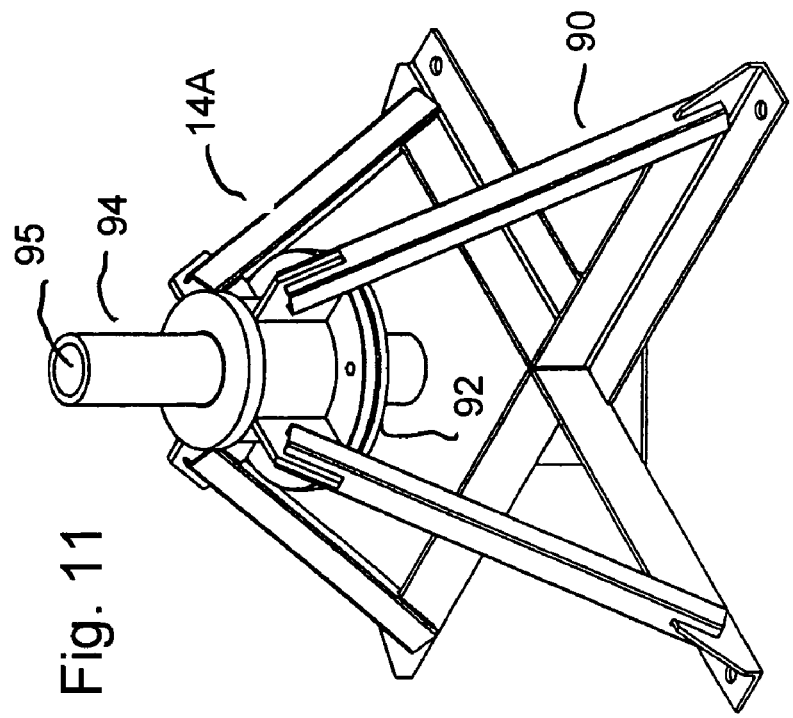
FIG. 11 is a perspective drawing of one embodiment of a vertical wind turbine support base.

The base section can be built in accordance with the prior art and can be a very simple design, as shown in FIG. 11. In FIG. 11, a base 14A is shown having a "X"-shaped structure 90, which supports an axle support housing 92. Housing 92 has an cylindrical shaft 94 with an opening 95 into which axle 70 is inserted. As such, as rotor section 12 rotates, axle 70 is rotated within shaft 94, and thus, rotates within housing 92. This rotation of axle 70 within housing 92 is used to create electrical energy in a generator, or the like, located within base 14A in a fashion known within the art.

The generator can also be connected to the axle 70 through a gear box, transmission assembly or the like, but preferably, it is essentially directly attached to the generator in order to provide a direct drive generator. Design of the electrical generation equipment is, however, believed to be within the scope of the skilled artisan.

Further, while the present invention has been shown with one generator to be located with base 14 or 14A, it is to be understood that an additional or substitute generator can be fitted to the opposition end of rotor section 12 so as to provide, in some situations, two generators connected to rotor section 12.

Figure 12:
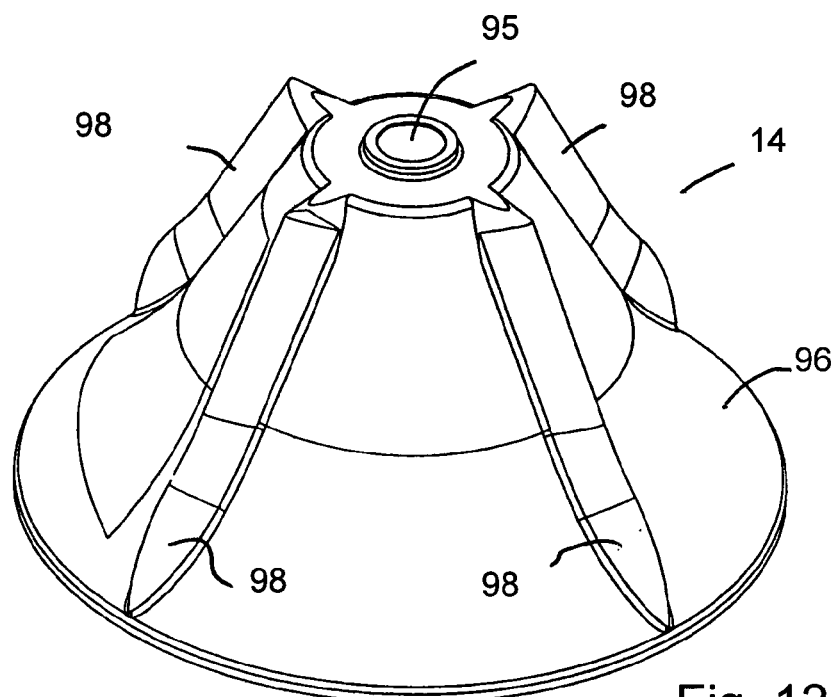
FIG. 12 is a perspective drawing of a second embodiment of a vertical wind turbine support base.

In FIG. 12, a modified base section, 14 is shown which is built by covering base 14A with a base section cover 96. As part of cover 96, a series of raised projections, or baffles 98 are provided which collect air from the passing air flow, and together with the sloped cover shape, force air up into rotor section 12. This diverted air flow provides additional wind energy to rotor section 12, and, provides additional lift to the rotor section. The additional wind flow aids in improving the efficiency of the wind turbine by increasing the total air flow to the rotor section, and/or by reducing the effective weight of the rotor section, as previously described. Projections 98 can be straight, as shown in FIG. 12, or can be curved or some other shape, including a helical design, in order to provide increased air flow from the base into the rotor section.

The projections or baffles 98 thereby act as passive wind deflectors, and a variety of such devices can be used in combination with the rotor section of the present invention. This can include a number of passive wind deflectors including baffles, projections, stators, screens, funnels, or the like which are either designed to either merely increase wind flow to the rotor section, or designed to also provide additional lift to the rotor section. These passive wind deflectors can be attached to the wind turbine itself, or can be separate devices which are located adjacent to the wind turbine structure.

The base section is thus adapted to receive the axle, or what also might be called the rotor section output shaft. The axle is inserted into the base section, and preferably rests, rides and/or slides on one of more bearings. The bearings are preferably selected to provide minimal resistance while providing suitable performance properties, and selection of suitable bearing structures is known within the art.

The base section will also be provided with means for locking the axle in place in order to prevent the rotor section from being accidentally pulled out of the base unit. This type of locking system is also known within the art.

Additionally, other devices can be included to adjust the rotor performance. These can include, for example, one or more mechanical or electrical braking systems which can be used to limit the rotor section speed in high wind situations, or the like. These types of braking systems are again, known within the art.

Figure 13:
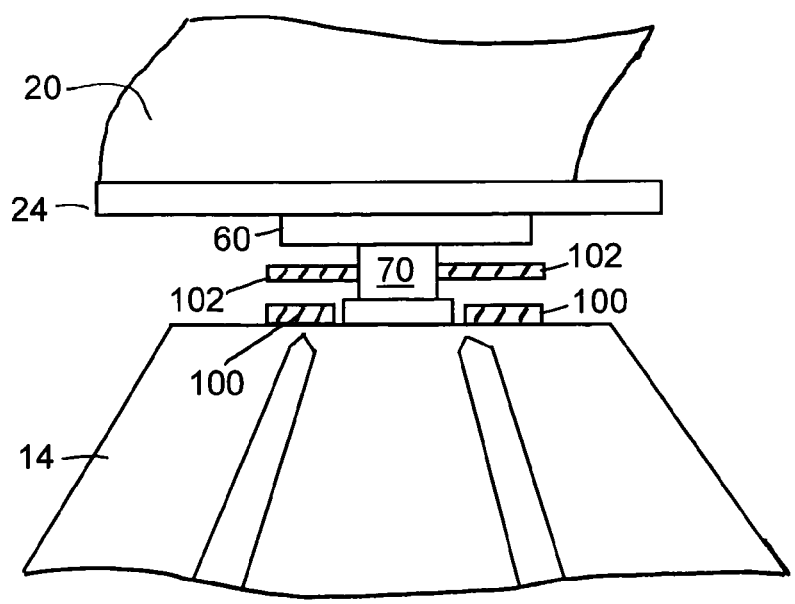
FIG. 13 is a cross-sectional view of a portion of a support structure for a vertical wind turbine of the present invention.

Also, the rotor and base section can be fitted with magnets, either of the permanent or electrical type, that can be adapted to provide either a braking effect, or, to provide a repulsive effect to add additional lift to the rotor section. For example, in FIG. 13, a base section 14 is shown having a permanent magnet 100 fitted to the top of base section 14, and which is in close proximity to a permanent magnet 102 fitted to the axle 70A of the rotor section. Magnet 100 can supply an attractive force, when used as a braking device such as in constant high speed applications, but can also be set up to provide a repulsive force to provide additional lift to the rotor section, and thus lower the rotor section effective weight.

Also, magnet 100 can be replaced with an electromagnet which can be turned on or off as necessary to provide the attractive or repulsive force.

The drawings of the present application have shown the wind turbine being operated in a vertical orientation with the base at the bottom of the device. However, the skilled artisan will clearly understand that the present invention might be operated so as to have the base section at the top of the device so that it might be hung upside down under a bridge or the like.

Alternatively, the wind turbine of the present application might also be used in a horizontal, or more generally, in a non-vertical application depending on the design parameters established for the particular device. Further, additional devices, such as photovoltaic cells can be attached to increase the electrical output from the device.

Thus, it is apparent that there has been provided, in accordance with the present invention, a vertical axis wind turbine which fully satisfies the goals, objects, and advantages set forth hereinbefore. Therefore, having described specific embodiments of the present invention, it will be understood that alternatives, modifications and variations thereof may be suggested to those skilled in the art, and that it is intended that the present specification embrace all such alternatives, modifications and variations as fall within the scope of the appended claims.

Additionally, for clarity and unless otherwise stated, the word "comprise" and variations of the word such as "comprising" and "comprises", when used in the description and claims of the present specification, is not intended to exclude other additives, components, integers or steps.

Moreover, the words "substantially" or "essentially", when used with an adjective or adverb is intended to enhance the scope of the particular characteristic; e.g., substantially or essentially planar is intended to mean planar, nearly planar and/or exhibiting characteristics associated with a planar element.

Further, use of the terms "he", "him", or "his", is not intended to be specifically directed to persons of the masculine gender, and could easily be read as "she", "her", or "hers", respectively.

Also, while this discussion has addressed prior art known to the inventor, it is not an admission that all art discussed is citable against the present application.

We claim:

1. A vertical axis wind turbine having a base structure and a rotor section comprising at least two blades for collection of wind energy, a lower support brace attached to the lower end of each blade, an upper support brace attached to the upper end of each blade, an axle for rotation of said rotor section which axle is affixed to said lower support brace and is used to operatively connect said rotor section to said base structure, wherein at least a portion of said blades have a non-linear design so as to provide both a rotation and lifting force on said rotor section as a result of wind impacting said wind turbine, and wherein each of said blades comprises a linear trailing edge and a helical surface configuration.

2. A vertical axis wind turbine as claimed in claim 1 wherein said linear trailing edges of said blades define a central open area along a vertical rotational axis of said rotor section.

3. A vertical axis wind turbine as claimed in claim 2 where said helical blades overlap said vertical rotational axis so as to prevent wind from passing through said central open area without impacting said blades, regardless of wind direction.

4. A vertical axis wind turbine as claimed in claim 1 comprising between 3 and 5 blades, and said blades are circumferentially equally spaced apart about the rotor in an annular array.

5. A vertical axis wind turbine as claimed in claim 1 additionally comprising one or more intermediate support braces.

6. A vertical axis wind turbine as claimed in claim 1 wherein said blades are orientated to provide a positive lifting force.

7. A vertical axis wind turbine as claimed in claim 1 wherein said blades have a uniform horizontal cross-section width throughout their vertical length.

8. A vertical axis wind turbine having a base structure and a rotor section comprising at least two blades for collection of wind energy, a lower support brace attached to the lower end of each blade, an upper support brace attached to the upper end of each blade, an axle for rotation of said rotor section which axle is affixed to said lower support brace and is used to operatively connect said rotor section to said base structure, wherein at least a portion of said blades have a non-linear design so as to provide both a rotation and lifting force on said rotor section as a result of wind impacting said wind turbine, and wherein any or all of said blades comprise a means for adjusting the drag coefficient on either or both sides of said blades.

9. A vertical axis wind turbine as claimed in claim 8 wherein said means for adjusting the drag coefficient comprises a textured surface.

10. A vertical axis wind turbine as claimed in claim 9 wherein said textured surface is provided by a series of dimples on said surface.

11. A vertical axis wind turbine as claimed in claim 8 wherein said means for adjusting the drag coefficient comprises a plurality of projecting fibs on said surface.

12. A vertical axis wind turbine as claimed in claim 2 wherein said rotor section has an overall height of between 1.5 and 3 meters, a diameter of between 0.5 and 2 meters, and said central open area is between 7 and 20% of the overall rotor section diameter.

13. A vertical axis wind turbine as claimed in claim 1 additionally comprising lift elements for reducing the effective weight of the rotor section.

14. A vertical axis wind turbine as claimed in claim 13 wherein said lift elements are passive lift elements.

15. A vertical axis wind turbine as claimed in claim 14 wherein said passive lift elements are baffles on said base section.

16. A vertical axis wind turbine as claimed in claim 1 additionally comprising a braking system for controlling the rotational speed of said rotor section.

17. A vertical axis wind turbine having a base structure and a rotor section comprising at least two blades for collection of wind energy, a lower support brace attached to the lower end of each blade, an upper support brace attached to the upper end of each blade, an axle for rotation of said rotor section which axle is affixed to said lower support brace and is used to operatively connect said rotor section to said base structure, wherein at least a portion of said blades have a non-linear design so as to provide both a rotation and lifting force on said rotor section as a result of wind impacting said wind turbine, and additionally comprising a series of magnets to provide positive or negative lift to said rotor section.

18. A rotor section for use in a vertical axis wind turbine rotor, which rotor section is adapted to be fitted into a vertical axis wind turbine base section, comprising at least two blades for collection of wind energy, a lower support brace attached to the lower end of each blade, an upper support brace attached to the upper end of each blade, an axle for rotation of said rotor section which axle is affixed to said lower support brace and is adapted to be used to operatively connect said rotor section to said base structure, wherein at least a portion of said blades have a non-linear design so as to provide both a rotation and lifting force on said rotor section as a result of wind impacting said wind turbine and wherein each of said blades comprises a linear trailing edge and a helical surface configuration.

19. A rotor section as claimed in claim 18 wherein said linear trailing edges of said blades define a central open area along a vertical rotational axis of said rotor section.

20. A rotor section as claimed in claim 19 where said helical blades overlap said vertical rotational axis so as to prevent wind from passing through said central open area without impacting said blades, regardless of wind direction.

21. A rotor section as claimed in claim 18 comprising between 3 and 5 blades, and said blades are circumferentially equally spaced apart about the rotor in an annular array.

* * * * *